United States Patent
Karighattam et al.

(10) Patent No.: US 9,847,971 B2
(45) Date of Patent: Dec. 19, 2017

(54) SYSTEM AND METHOD FOR PROVIDING HIGH AVAILABILITY IN ROUTERS USING AN L1 BYPASS

(71) Applicant: Cisco Technology, Inc., San Jose, CA (US)

(72) Inventors: Kishore Karighattam, Austin, TX (US); Jian Wu, Autin, TX (US); Madhusudhan Karnam Rao, Austin, TX (US); Madhu Babu Kodali, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 14/931,563

(22) Filed: Nov. 3, 2015

(65) Prior Publication Data

US 2017/0126621 A1   May 4, 2017

(51) Int. Cl.
*H04L 29/06* (2006.01)
(52) U.S. Cl.
CPC ................................ *H04L 63/0209* (2013.01)
(58) Field of Classification Search
CPC ..... H04L 63/02; H04L 63/20; H04L 63/0209; H04L 63/0236; H04L 63/029
USPC ............................. 726/11, 13; 713/153, 154
See application file for complete search history.

(56) References Cited

U.S. PATENT DOCUMENTS

| | | | | |
|---|---|---|---|---|
| 7,512,743 | B2 * | 3/2009 | Tom | G06F 9/44573 711/146 |
| 7,539,857 | B2 * | 5/2009 | Bartlett | H04L 63/0218 709/224 |
| 7,646,775 | B2 * | 1/2010 | Capone | H04L 63/029 370/352 |
| 7,673,049 | B2 * | 3/2010 | Dinello | H04L 63/0236 709/226 |
| 7,941,837 | B1 * | 5/2011 | Jiang | H04L 63/0209 370/352 |
| 8,689,319 | B2 * | 4/2014 | Gray, II | H04L 63/0236 726/11 |
| 9,165,140 | B2 * | 10/2015 | McGee | G06F 21/51 |
| 2006/0179296 | A1 * | 8/2006 | Bartlett | H04L 63/0218 713/152 |

* cited by examiner

*Primary Examiner* — Hosuk Song
(74) *Attorney, Agent, or Firm* — P. Su (57) ABSTRACT

According to one aspect, a method includes coupling first and second security units in series between first and second networks. The first security unit obtains packets from the first network, and the second security unit obtains the packets from the first security unit. The first security unit includes first logic arranged to provide security. The second security unit includes second logic arranged to provide security. The method also includes configuring the second security unit in a bypass mode such that the second logic does not provide security, and obtaining a first packet from the first network via the first security unit. The first packet is identified as secure by the first logic. Finally, the method includes providing the first packet from the second security unit to the second network by passing the first packet through the second unit without using the second logic to provide security.

20 Claims, 10 Drawing Sheets

SYSTEM AND METHOD FOR PROVIDING HIGH AVAILABILITY IN ROUTERS USING AN L1 BYPASS

TECHNICAL FIELD

The disclosure relates generally to communications networks. More particularly, the disclosure relates to efficiently and effectively providing High Availability in networks.

BACKGROUND

High Availability (HA) generally provides resilience within an Internet Protocol (IP) network, and increases the availability of the IP network. In general, units, e.g., routers, in an IP network that are in an HA mode are connected in parallel, such that one unit is an active unit while the other is a standby unit. The topology associated with connecting a plurality of routers in parallel such that one unit is an active router while another router is a standby router is often complicated, and utilizes multiple switches and connectors from each of the routers.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

In one embodiment, a method includes communicably coupling a first security unit and a second security unit in series between a first network and a second network, the first security unit being arranged to obtain packets from the first network, the second security unit arranged to obtain the packets from the first security unit, wherein the first security unit includes first logic arranged to provide security and the second security unit includes second logic arranged to provide security. The method also includes configuring the second security unit in a bypass mode, wherein configuring the second security unit in the bypass mode causes the second logic not to provide security, and obtaining a first packet from the first network via the first security unit on the second security unit, wherein the first packet is identified as being secure by the first logic arranged to provide security. Finally, the method includes providing the first packet from the second security unit to the second network. Providing the first packet from the second security unit to the second network includes passing the first packet through the second unit without using the second logic to provide security.

Description

High Availability (HA) is becoming increasingly important to maintain the integrity of a user experience with a network. HA enables network-wide protection by providing relatively fast recovery from failures or faults that may occur in a network. HA technology facilitates network-wide resilience to increase Internet Protocol (IP) network availability, and may provide substantially uninterrupted access to network resources such as applications, data, and substantially any content.

In many systems, HA involves connecting two security devices in parallel such that one security device acts as an active security device while the other security device acts as a standby devices. Connecting security devices in parallel general requires the use of additional switches and/or other components.

In one embodiment, two security appliances may be connected in series between two networks, and configured for HA. One of the security appliances may be configured in active mode, while the other security appliance may be configured in standby, or bypass, mode. The active security appliance may inspect traffic, e.g., data packets, obtained from a network and identify secure traffic, while the standby, or bypass, security appliance may receive secure traffic from the active security appliance and allow the secure traffic to pass there through without further inspection. Secure traffic may pass through the backup security appliance on a layer 1 (L1) hardware bypass. The active security appliance may also provide synchronization information to the standby, or bypass, security appliance. When the active security appliance fails or otherwise suffers a fault, the standby, or bypass, security appliance may be activated and effectively take over the inspection of traffic and the identification of secure traffic. In other words, an HA failover may occur efficiently. As substantially negligible latency results from secure traffic passing through a standby, or bypass, security appliance, the use of a plurality of security appliances connected in series provides efficient HA failover without significantly increasing network latency.

Figure 1:
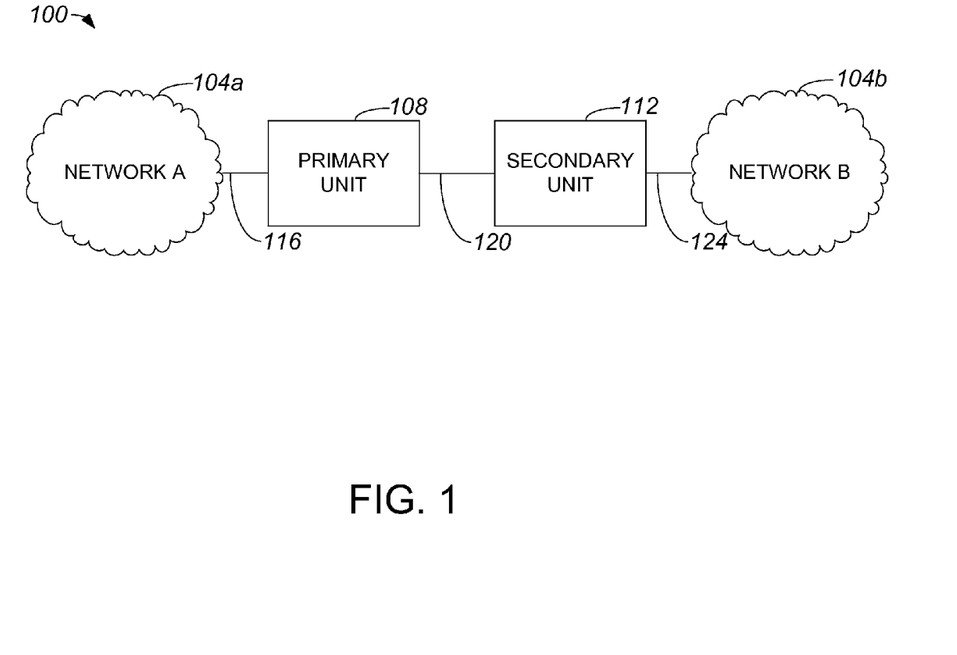
FIG. 1 is a block diagram representation of an overall network in which two security appliances are connected in series to provide High Availability (HA) in accordance with an embodiment.

Referring initially to FIG. 1, an overall network in which two security appliances, which may be configured to provide an L1 bypass using hardware, are connected in series to provide HA will be described in accordance with an embodiment. An overall network 100 may include a first network 'A' 104a, and a second network 'B' 104b. In one embodiment, first network 104a may be an intranet, and second network 104b may be an external network such as an Internet.

Also included in overall network 100 are a primary unit 108 and a secondary unit 112, which are connected in series or daisy chained. Connecting, or otherwise communicably coupling, primary unit 108 and secondary unit 112 causes traffic to flow from first network 104a to second network 104b through primary unit 108 and then through secondary unit 112.

Traffic originating at first network 104a flows on a link 116 to primary unit 108. From primary unit 108, traffic flows on a link 120 to secondary unit 112. Traffic then flows from secondary unit 112 to second network 104b on a link 124. Links 116, 120, 124 may be wired and/or wireless communications links. It should be appreciated that traffic may generally flow from first network 104a to second network 104b, and may also flow from second network 104b to first network 104a.

Units 108, 112 may generally be security appliances such as adaptive security appliance (ASA) routers or firewall appliances. Primary unit 108 is typically configured as an active unit while secondary unit 112 is typically configured as a standby, or backup, unit. Thus, primary unit 108 may inspect traffic and provide security, while secondary unit 112 acts as a bypass, e.g., provides an L1 hardware bypass, such that traffic passes through secondary unit 112 without secondary unit 112 inspecting traffic or providing security. Secondary unit 112, however, is configured to switch from acting as a bypass to inspecting traffic and providing security, upon a failure of primary unit 108. When primary unit 108 fails, primary unit 108 acts as a bypass, e.g., provides an L1 hardware bypass, while secondary unit 112 provides inspection and security.

Figure 2:
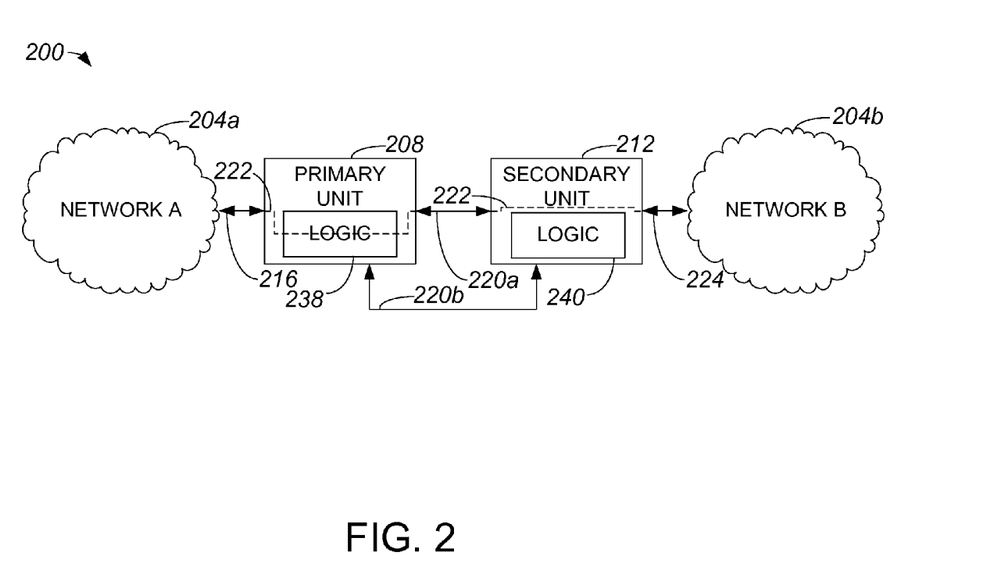
FIG. 2 is a block diagram representation of an overall network in which two security appliances are connected in series to provide HA, as shown with a link arranged to carry synchronization information, in accordance with an embodiment.

FIG. 2 is a block diagram representation of an overall network in which two security appliances are connected in series to provide HA, as shown with a network communication path between a first network and a second network, in accordance with an embodiment. An overall network 200 may include a first network 'A' 204a, and a second network 'B' 204b. Overall network 200 may also include a primary unit 208 and a secondary unit 212, which are connected in series or daisy chained. Primary unit 208 includes logic 238 which, when primary unit 208 is active, inspects traffic and provides security. Secondary unit 212 includes logic 240 arranged to inspect traffic and to provide security when secondary unit 212 is active. In the embodiment as shown, primary unit 208 is active and secondary unit 212 is in standby mode or bypass mode. When secondary unit 212 is in bypass mode, secondary unit does not inspect traffic or provide traffic when traffic passes through secondary unit 212.

Traffic originating at first network 204a flows on a path 222 through primary unit 208 and secondary unit 212 to second network 204b. Traffic follows from first network 204a to primary unit 208 on a link 216, i.e., path 222 includes link 216. The traffic flow on path 222 through primary unit 208 such that the traffic is inspected by primary unit 208, and security measures are effectively implemented by primary unit 208 with respect to the traffic. Once processed by logic 238 on primary unit 208, traffic identified by primary unit 208 as being safe or otherwise secure flows along path 222 over a link 220a to secondary unit 212. In the described embodiment, because secondary unit 212 is in bypass mode, path 222 effectively bypasses logic 240 such that the traffic is not inspected by secondary unit 212, and no security is provided by secondary unit 212. After traffic flows through secondary unit 212, e.g., on an L1 hardware bypass (not shown), traffic flows along path 222 over a link 224 to second network 204b.

Figure 3:
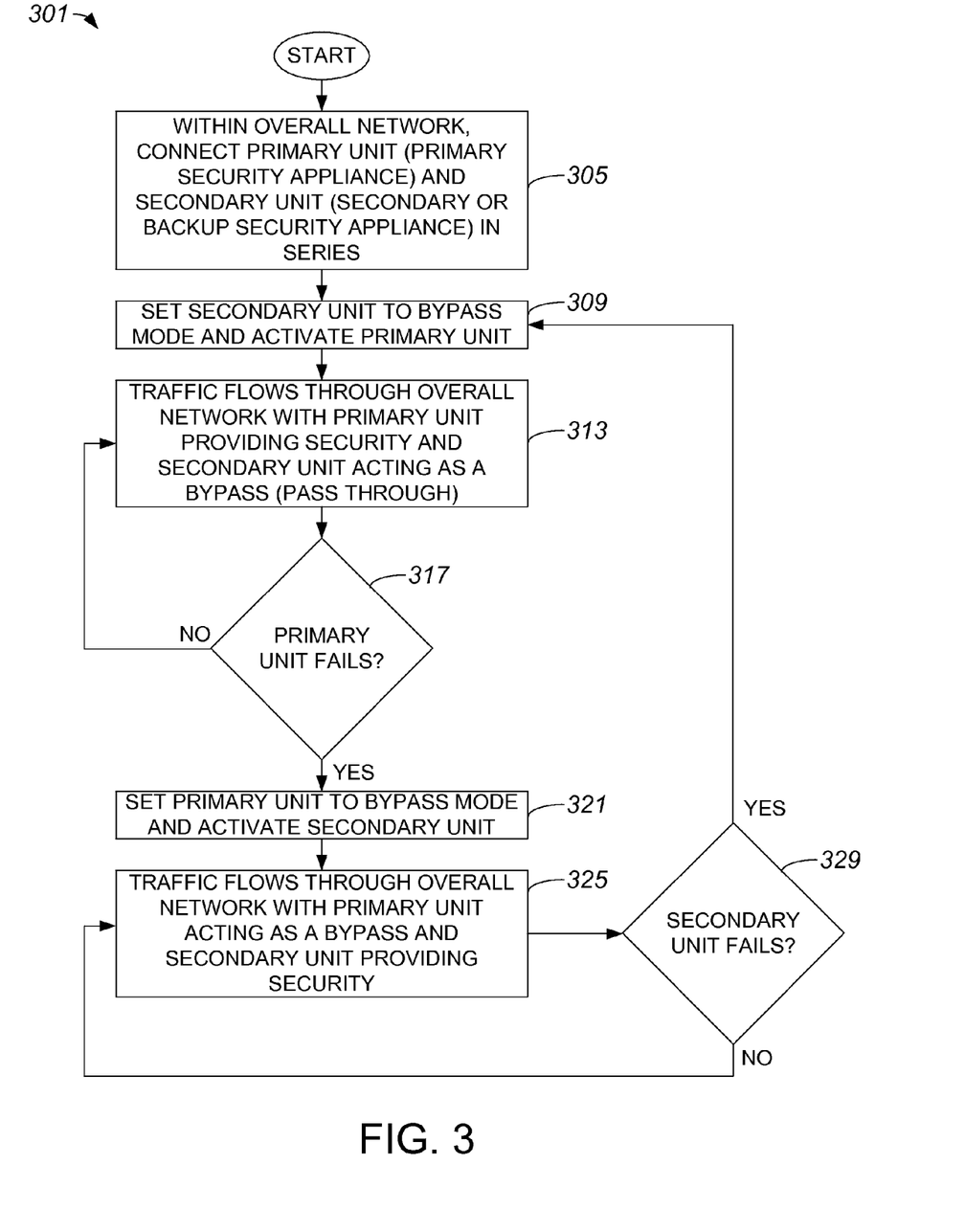
FIG. 3 is a process flow diagram which illustrates a method of allowing traffic to flow through an overall network in which two security appliances are connected in series to provide HA in accordance with an embodiment.

With reference to FIG. 3, a method of allowing traffic to flow through an overall network in which two units, e.g., security appliances, are connected in series to provide HA will be described in accordance with an embodiment. A method 301 of allowing traffic to flow through an overall network begins at step 305 in which a primary unit and a secondary unit are connected, e.g., communicably coupled, in series within the overall network. In one embodiment, the primary unit and the secondary unit may be security appliances such as adaptive security appliances and/or firewall appliances.

At step 309, the secondary unit is set to a bypass mode and the primary unit is activated, such that traffic obtained from the primary unit by the secondary unit passes through the secondary unit substantially without being inspected. For example, when the secondary unit is set to a bypass mode, any traffic obtained by the secondary unit will not be inspected and/or processed by logic included in the secondary unit and will, instead, pass through the secondary unit on a hardware bypass.

Once the secondary unit is set to a bypass mode, traffic is permitted to flow through the overall network in step 313 with the primary unit providing security and the secondary unit acting as a bypass or a pass-through. It should be appreciated that synchronization data is also provided by the primary unit to the secondary unit. A determination is made in step 317 as to whether the primary unit has failed. That is, it is determined in step 317 whether the primary unit has lost power, or is otherwise no longer active.

If the determination in step 317 is that the primary unit has not failed, then process flow returns to step 313 in which traffic continues to flow through the overall network with the primary unit providing securing and the secondary unit acting as a bypass. Alternatively, if it is determined in step 317 that the primary unit has failed, the primary unit is set to a bypass mode and the secondary unit is activated, or set to an active mode, in step 321. In one embodiment, the primary unit may automatically set itself to a bypass mode, and the secondary unit may automatically activate itself, when the primary unit has failed.

Once the primary unit is set to a bypass mode in step 321, traffic flows through the overall network in step 325 with the primary unit acting as a bypass and the secondary unit providing security. As the secondary unit is already synced up with the primary unit, there is substantially no traffic lost, e.g., no packets are lost, upon switching to using the secondary unit to provide security. In other words, a stateful failover may be performed with respect to the primary unit and the secondary unit. In general, when the secondary unit provides security, the secondary unit also provides synchronization information to the primary unit.

A determination is made in step 329 as to whether the secondary unit has failed. If it is determined in step 329 that the secondary unit has failed, process flow proceeds to step 309 in which the secondary unit is set to bypass mode, and the primary unit is activated. In the described embodiment, the failure or primary unit is assumed to be resolved, and the primary unit is assumed to be placed on standby prior to the time it is determined that the secondary unit has failed.

Alternatively, if it is determined in step 329 that the secondary unit has not failed, process flow returns to step 325 in which traffic continues to flow through the overall network with the primary unit acting as a bypass and the secondary unit providing security. It should be appreciated that even in the event that the failure of the primary unit has been resolved, the secondary unit may continue to provide security with respect to traffic in the overall network. Allowing the secondary unit to continue to provide security, even after issues with the primary unit are resolved, allows traffic to continue to flow substantially without incurring latency or delays that may be associated with switching to using the primary unit to provide security after the issues with primary unit are resolved.

Figure 4:
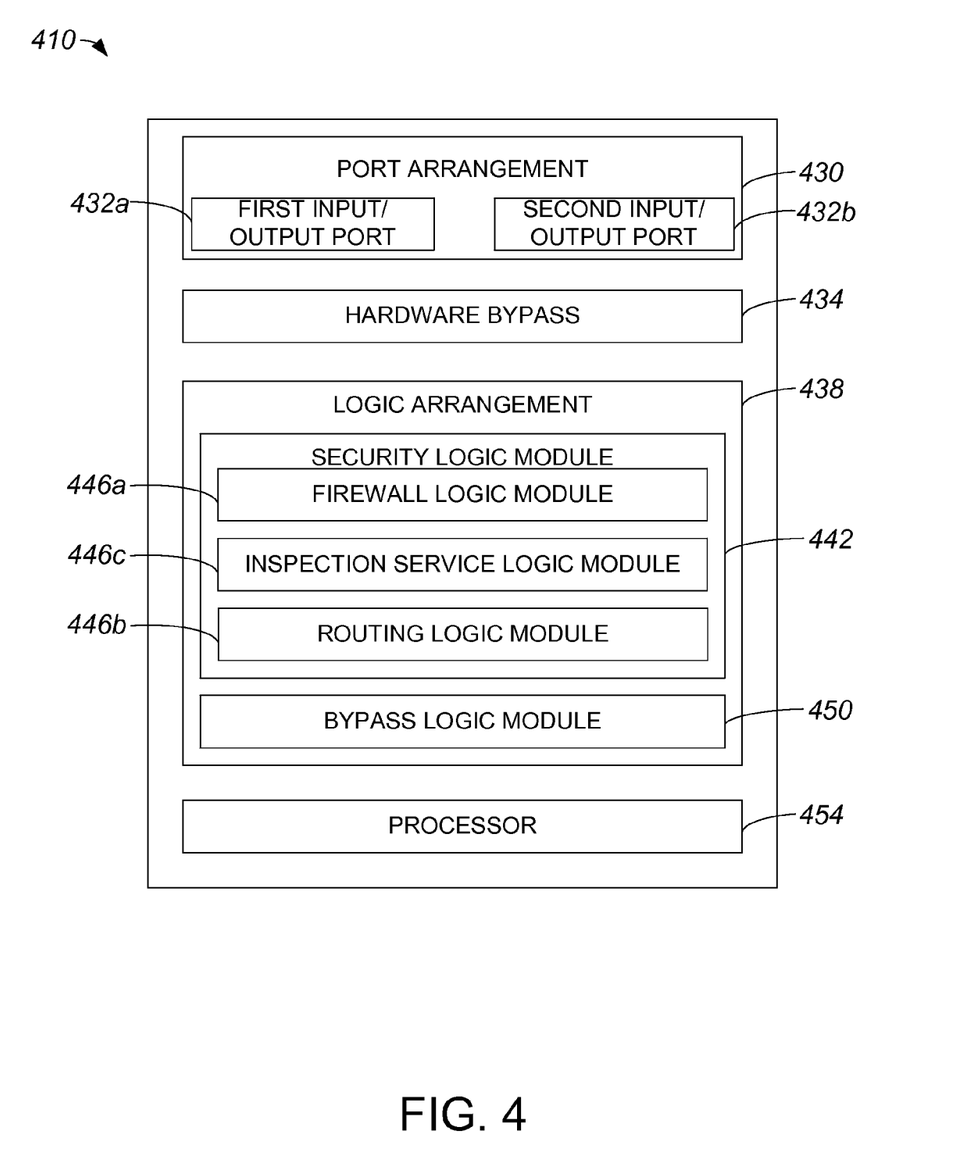
FIG. 4 is a diagrammatic representation of a unit, e.g., a security appliance, in accordance with an embodiment.

A primary unit and a secondary unit included in an overall network to provide HA with an L1 hardware bypass may be substantially the same. That is, a primary unit and a secondary unit may effectively be the same type of device. FIG. 4 is a diagrammatic representation of a unit, e.g., a security appliance, in accordance with an embodiment. A security appliance 410 may be any suitable adaptive security appliance (ASA) router or any suitable firewall appliance. In one embodiment, security appliance 410 may be a Cisco ISA-3000 ASA available commercially from Cisco Systems, Inc., of San Jose, Calif. A Cisco ISA-3000 ASA has multiple, e.g., four, data ports and one management port.

Security appliance 410 includes a port arrangement 430, a hardware bypass 434, a logic arrangement 438, and a processor 454. Port arrangement 430 is configured to allow data to be provided to security appliance 410, and to allow data to be forwarded by security appliance 410. Port arrangement 430 may be in communication with links (not shown) associated with a network, and generally includes a plurality of input/output (I/O) ports 432a, 432b. I/O ports 432a, 432b may include at least one data port and a management port. In one embodiment, port arrangement 430 may include four data ports and one management port. When port arrangement 430 includes four data ports, for example, the four data ports may effectively make up two bypass pairs. Port arrangement 430 typically facilitates the connection of security appliance 410 in series between another security appliance (not shown) and a network. HA traffic may be shared on a management port such that, for example, a primary unit provides stateful information about each session, and updates a routing table and ARP tables to a secondary unit such that the secondary unit may take over substantially instantly if a primary unit fails.

A data port may support L1 hardware bypass. In one embodiment, relays may be used to support L1 hardware bypass. A L1 hardware bypass circuit may include electro-mechanical relays which effectively cause two ports in a bypass pair to connect electrically. It should be appreciated that although two I/O ports 432a, 432b are shown, the number of I/O ports included in port arrangement 430 may vary widely. It should be appreciated that, in one embodiment, one of I/O ports 432a, 432b may effectively be dedicated to maintain synchronization between security appliance 410 and another security appliance (not shown), i.e., a security appliance connected in series to security appliance 410, such that a failover may be efficiently performed.

Hardware bypass 434, e.g., an L1 hardware bypass, allows traffic to flow through security appliance 410 without being subject to inspection and/or security procedures. That is, hardware bypass 434 allows security appliance 410 to effectively act as a pass-through when security appliance 410 is used in a bypass mode. Logic arrangement 438 generally includes hardware and/or software logic which may be executed by processor 454. Software logic included in logic arrangement 438 may be embodied on a computer-readable medium. Logic arrangement 438 includes a security logic module 442 and a bypass logic module 450.

Security logic module 442 provides security features for security appliance 410, and effectively identifies secure traffic. That is, security logic module 442 inspects traffic obtained on port arrangement 430 from an overall network, determines whether obtained traffic is secure, and provides traffic determined to be secure to the overall network using port arrangement 430. Generally, security logic module 442 provides HA.

In one embodiment, security logic module 442 includes a firewall logic module 446a, a routing logic module 446b, and an inspection service logic module 446c. Firewall logic module 446a allows security appliance 410 to function as a firewall. Routing logic module 446b allows traffic identified as secure, e.g., traffic which is determined to be suitable to pass through a firewall by firewall logic module 446a, to be routed towards an intended destination for the traffic. Inspection service logic module 446c inspects traffic obtained on port arrangement 430, and typically provides the traffic to firewall logic module 446a.

Bypass logic module 450 allows security appliance 410 to be configured or otherwise set to either provide security services, e.g., to determine whether traffic is secure, or configured to use hardware bypass 434. That is, bypass logic module 450 may be used to cause traffic provided to security appliance 410 to either be processed by security logic module 442, or to pass through security appliance 410 on hardware bypass 434. In one embodiment, bypass logic module 450 may determine when it is appropriate for security appliance 410 to switch from a bypass mode to an active mode.

Figure 5A:
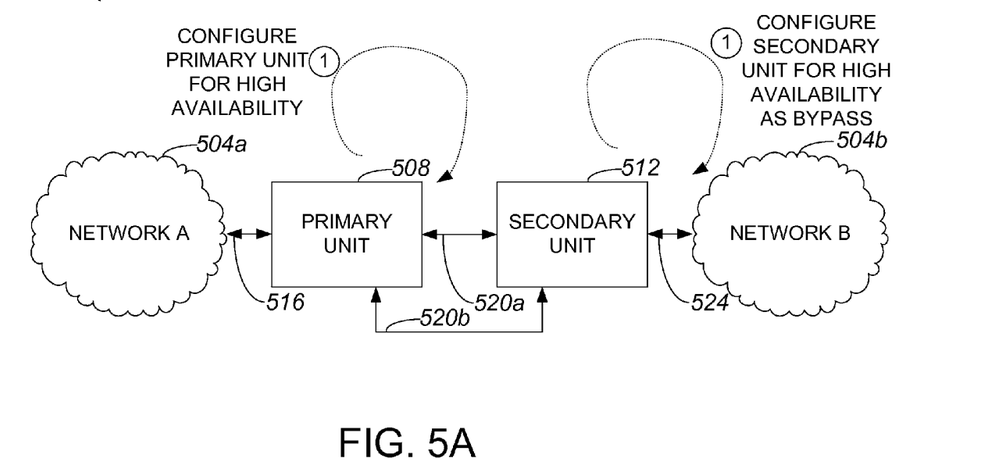
FIG. 5A is a diagrammatic representation of an overall network at a time t1 when a primary unit and a secondary unit are configured in accordance with an embodiment.

Referring next to FIGS. 5A-F, the flow of traffic through an overall network will be described in accordance with an embodiment. FIG. 5A is a diagrammatic representation of an overall network at a time t1 when a primary unit and a secondary unit are configured in accordance with an embodiment. Overall network 500 includes a first network 'A' 504a and a second network 'B' 504b which are effectively in communication over a path which includes a primary unit 508, a secondary unit 512, a link 516, a link 520a, a link 520b, and a link 524. First network 504a may be an intranet, or a network internal to an enterprise, while second network 504b may be a network external to an enterprise. Primary unit 508 and secondary unit 512 are security appliances which may be configured in a bypass mode, e.g., a mode in which an L1 hardware bypass may be implemented.

At a time t1, primary unit 508 is configured for HA, and secondary unit 512 is configured for HA as a bypass. In other words, primary unit 508 is configured as an active unit, while secondary unit 512 is configured as a standby unit or a bypass unit. In the described embodiment, secondary unit 512 is configured to provide a hardware bypass.

Figure 5B:
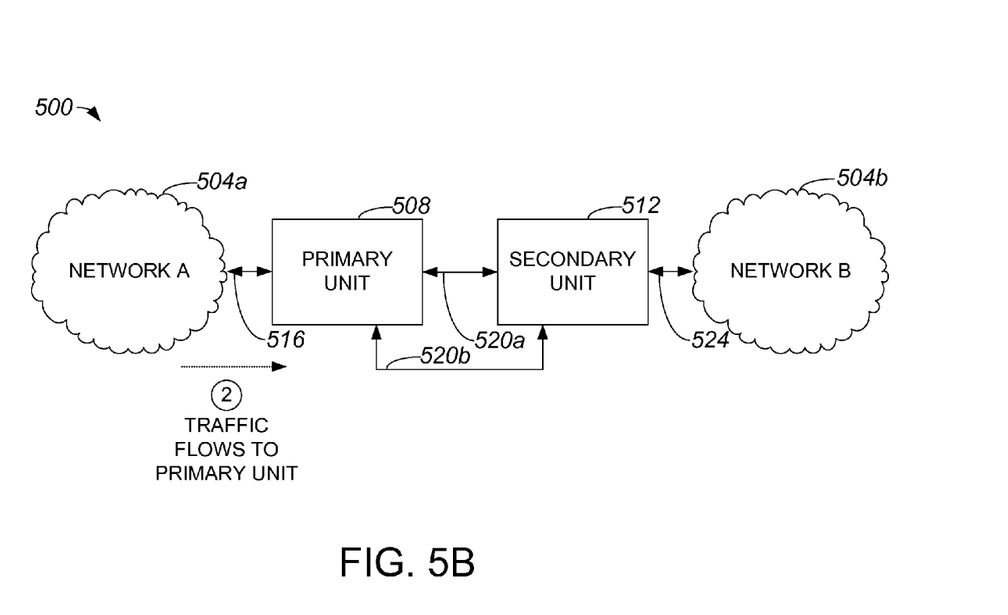
FIG. 5B is a diagrammatic representation of an overall network, e.g., network 500 of FIG. 5A, at a time t2 at which traffic flows to a primary unit in accordance with an embodiment.
Figure 5C:
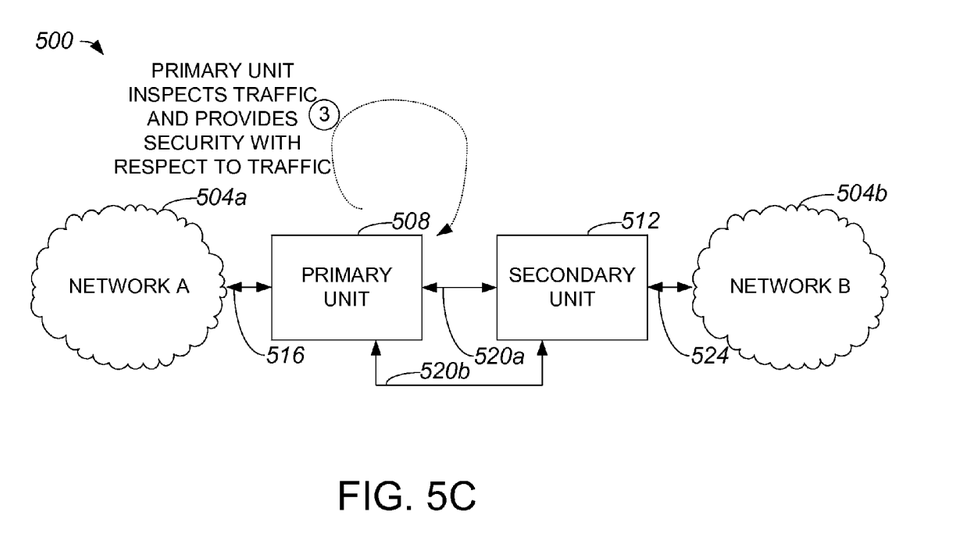
FIG. 5C is a diagrammatic representation of an overall network, e.g., network 500 of FIG. 5A, at a time t3 at which a primary unit inspects traffic and provides security in accordance with an embodiment.

Overall network 500 is shown at a time t2 in FIG. 5B. At time t2, traffic flows from first network 504a on link 516 to primary unit 508. The traffic generally includes at least one data packet. Upon obtaining the traffic at a time t3, as shown in FIG. 5C, primary unit 508 inspects the traffic and provides security with respect to the traffic. At time t2 within system 500, primary unit 508 may act as a firewall with respect to traffic obtained by primary unit 508 from first network 504a.

Figure 5D:
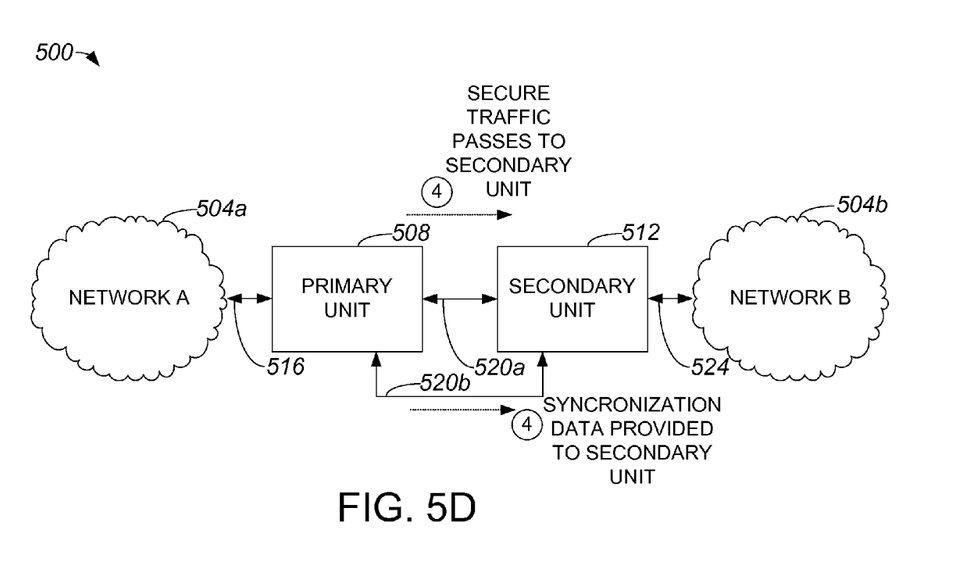
FIG. 5D is a diagrammatic representation of an overall network, e.g., network 500 of FIG. 5A, at a time t4 at which secure traffic flows to a secondary unit in accordance with an embodiment.

Primary unit 508 effectively identifies secure, or safe, traffic which may continue to flow towards second network 504b. FIG. 5D shows overall network 500 at a time t4. At time t4, primary unit 508 passes secure traffic to secondary unit 512 on link 520a, and generally prevents unsecure traffic from being passed to secondary unit 512. Also at time t4, primary unit 508 provides synchronization data to secondary unit 512 on link 520b. As will be appreciated by those skilled in the art, the synchronization data may be used by secondary unit 512 to allow secondary unit 512 to substantially synchronize itself with primary unit 508.

Figure 5E:
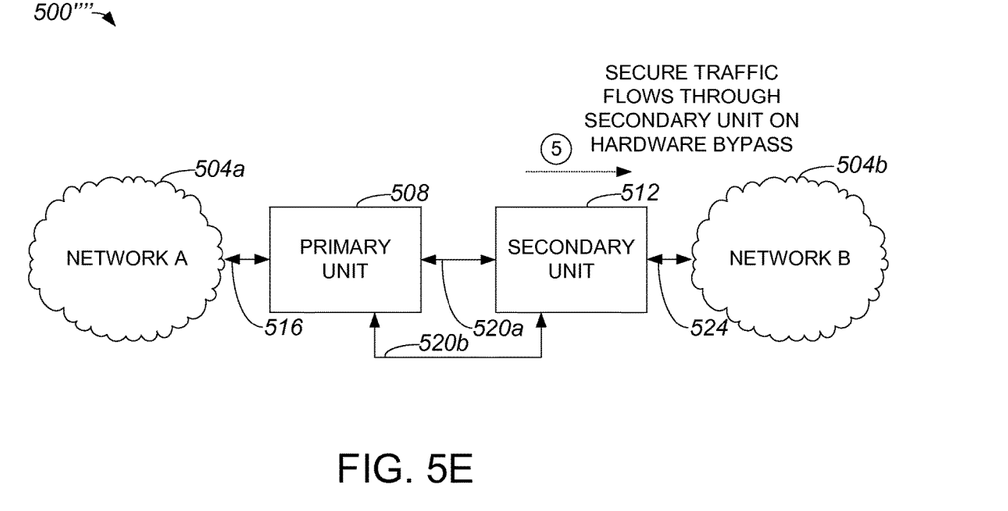
FIG. 5E is a diagrammatic representation of an overall network, e.g., network 500 of FIG. 5A, at a time t5 at which traffic flows through a secondary unit in bypass mode in accordance with an embodiment.
Figure 5F:
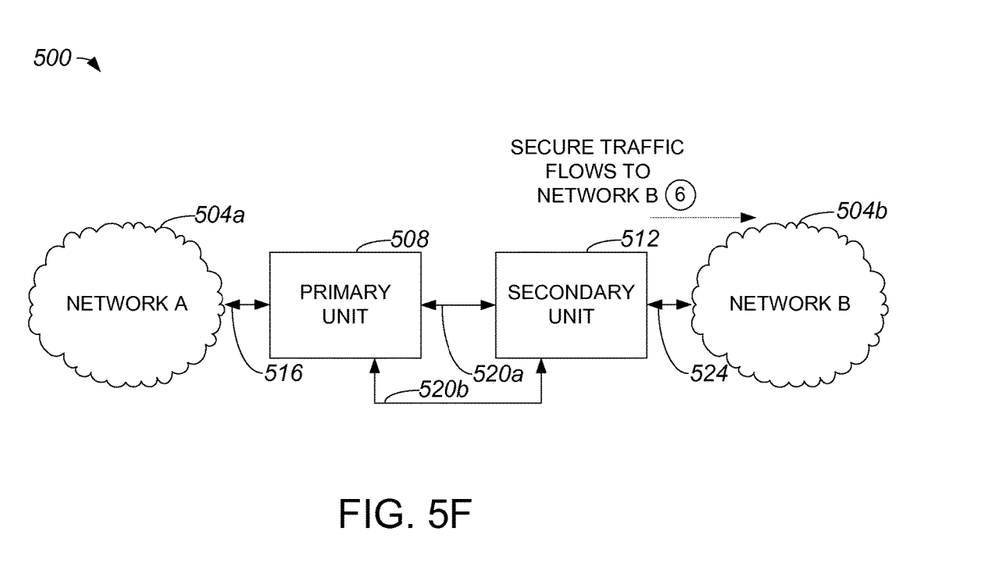
FIG. 5F is a diagrammatic representation of an overall network, e.g., network 500 of FIG. 5A, at a time t6 at which secure traffic flows from a secondary unit to a network in accordance with an embodiment.

At a time t5, as shown in FIG. 5E, secure traffic within system 500 flows through secondary unit 512 on a hardware bypass. That is, at time t5, secondary unit 512 allows secure traffic to flow from primary unit 508 towards second network 504b without subjecting the secure traffic to inspection and security. FIG. 5F depicts overall network 500 at a time t6. At time t6, secure traffic flows from secondary unit 512 on link 524 to second network 504b.

Traffic may continue to flow between first network 504a and second network 504b, with primary unit 508 providing inspection and security, and secondary unit 512 functioning as a bypass, unless primary unit 508 suffers a failure. As previously mentioned, primary unit 508 may lose power or otherwise be unable to provide inspection and security. When primary unit 508 fails, secondary unit 512 may be activated to provide inspection and security.

Figure 6A:
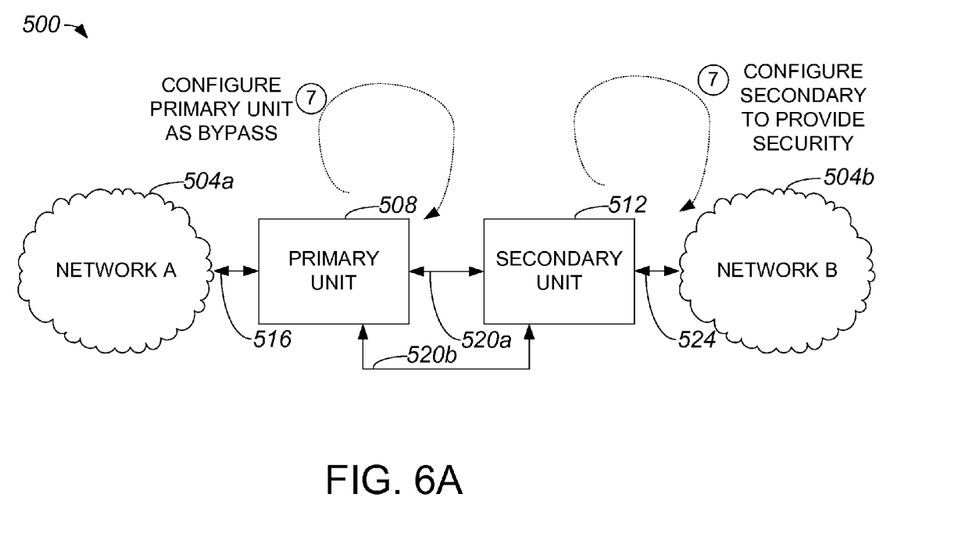
FIG. 6A is a diagrammatic representation of an overall network, e.g., network 500 of FIG. 5A, at a time t7 after a primary unit has failed in accordance with an embodiment.

With reference to FIGS. 6A-E, the flow of traffic through overall network 500 after primary unit 508 has failed will be described in accordance with an embodiment. FIG. 6A is a diagrammatic representation of overall network 500 of FIGS. 5A-F after primary unit 508 has failed in accordance with an embodiment. At a time t7, a primary unit 508 is configured as a bypass unit, and secondary unit 512 is configured to provide security. In other words, secondary unit 512 is effectively activated.

In one embodiment, primary unit 508 is automatically placed in bypass mode and secondary unit 512 is automatically activated when primary unit 508 fails. Secondary unit 512 may, for example, become aware of a failure of primary unit 508 when primary unit 508 has not responded to secondary unit 512 or provided expected information within a particular amount of time. It should be appreciated that because primary unit 508 has previously provided synchronization data to secondary unit 512, there is substantially no packet loss at secondary unit 512 when secondary unit 512 becomes active, as secondary unit 512 is synchronized with primary unit 508.

Figure 6B:
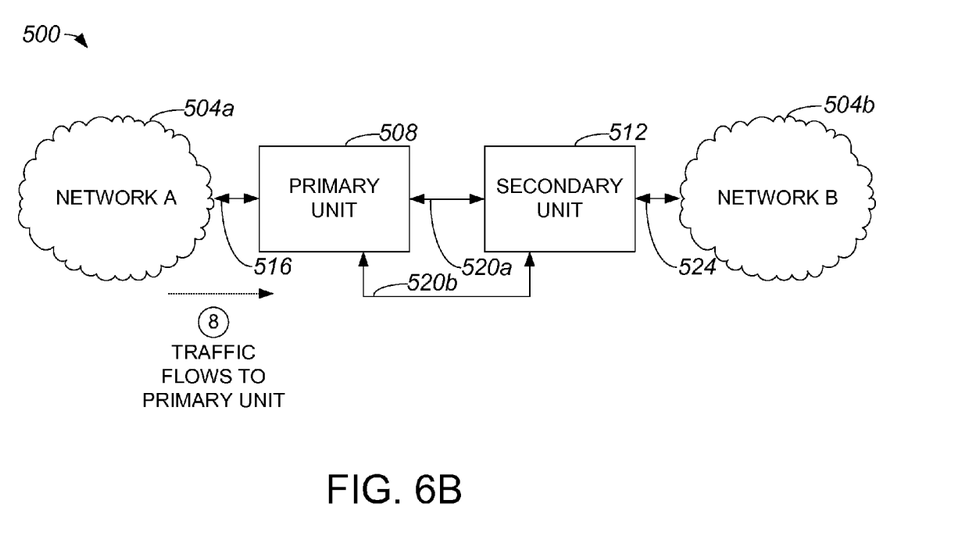
FIG. 6B is a diagrammatic representation of an overall network, e.g., network 500 of FIG. 5A, at a time t8 in which traffic flows to a primary unit accordance with an embodiment.
Figure 6C:
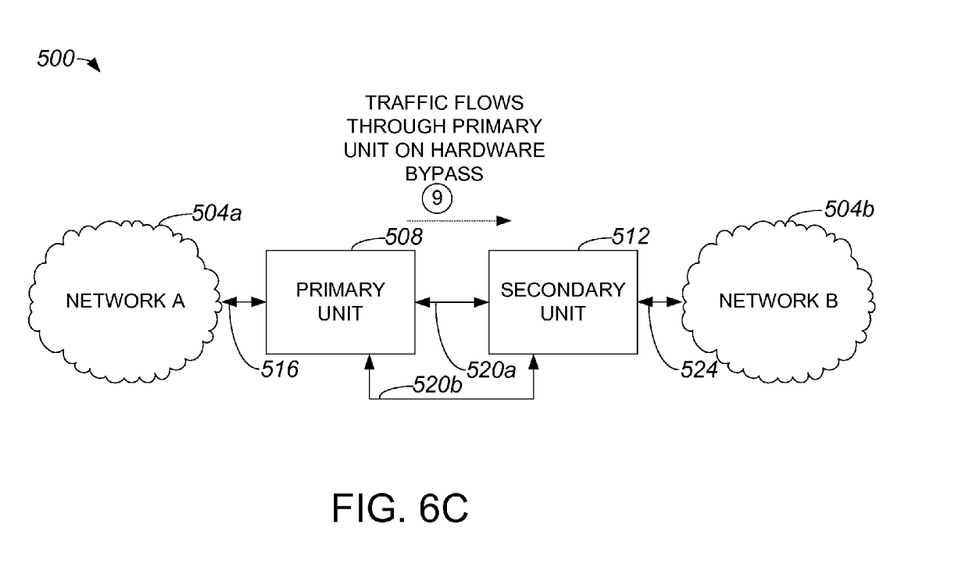
FIG. 6C is a diagrammatic representation of an overall network, e.g., network 500 of FIG. 5A, at a time t9 at which traffic flows through a primary unit on a hardware bypass in accordance with an embodiment.

At a time t8, as shown in FIG. 6B, traffic flows on link 516 from first network 504a to primary unit 508. Because primary unit 508 is in bypass mode, traffic passing through primary unit 508 passes through an L1 hardware bypass, and primary unit 508 does not inspect the traffic or provide security. As such, as shown in FIG. 6C, traffic flows through primary unit 508 on a hardware bypass at a time t9.

Figure 6D:
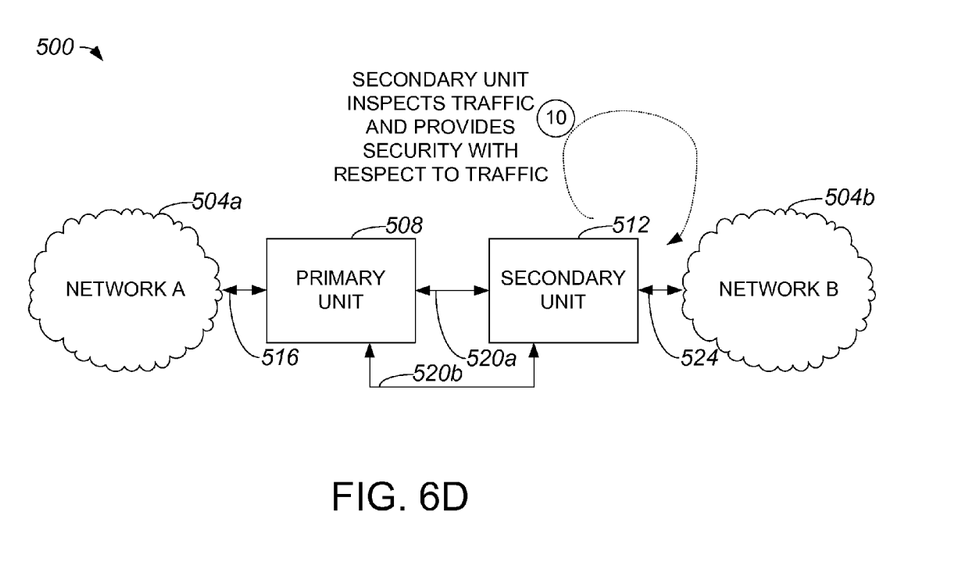
FIG. 6D is a diagrammatic representation of an overall network, e.g., network 500 of FIG. 5A, at a time t10 at which a secondary unit inspects traffic and provides security in accordance with an embodiment.
Figure 6E:
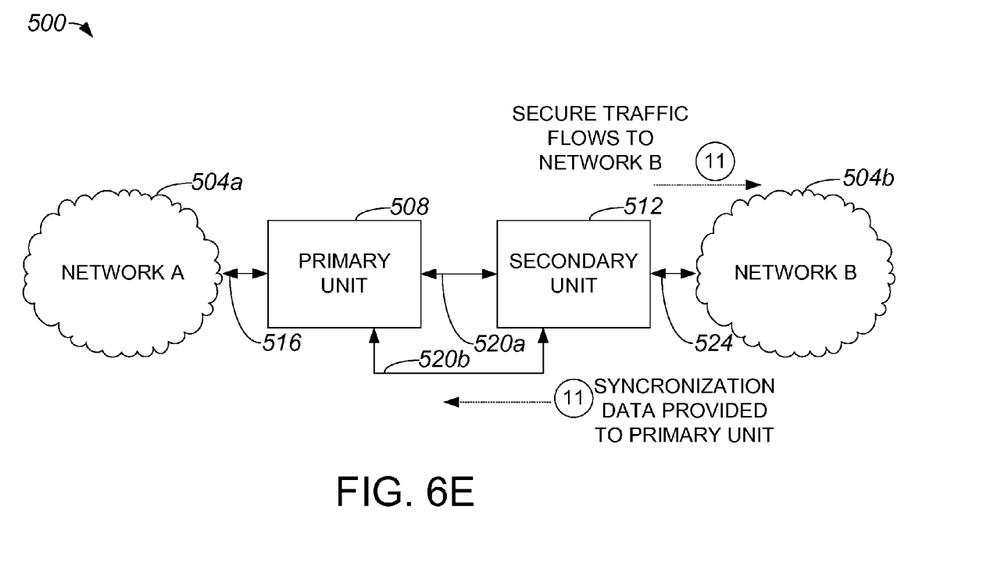
FIG. 6E is a diagrammatic representation of an overall network, e.g., network 500 of FIG. 5A, at a time t11 at which secure traffic flows from a secondary unit to a network in accordance with an embodiment.

Secondary unit 512 obtains traffic on link 520a from primary unit 508. Upon obtaining the traffic, secondary unit 512 inspects the traffic and provides security with respect to the traffic at a time t10, as shown in FIG. 6D. In one embodiment, secondary unit 512 serves as a firewall. At a time t11, as shown in FIG. 6E, traffic identified by secondary unit 512 as being secure flows to second network 504b on link 524. Also at time t1, secondary unit 512 provides primary unit 508 with synchronization data on link 520b.

The ability to effectively connect a plurality of security appliances, e.g., ASA routers, in series to provide HA such that one router acts as a hardware bypass allows HA to be deployed in an overall network in a relatively straightforward, cost effective manner. By allowing a first security appliance to operate in active mode while a second security appliance, which is connected in series to the first security appliance, operates as a hardware bypass, the second security appliance may relatively quickly become active upon a failure of the first security appliance.

Although only a few embodiments have been described in this disclosure, it should be understood that the disclosure may be embodied in many other specific forms without departing from the spirit or the scope of the present disclosure. By way of example, when a primary security appliance has multiple ports, some of the ports may be used to obtain traffic which is to be inspected while other ports may serve as a hardware bypass. At the same time, when a secondary security appliance has multiple ports, some of the ports some of the ports may be used to obtain traffic which is to be inspected while other ports may serve as a hardware bypass. Computational overhead associated with inspecting traffic and providing security may be distributed between the primary security appliance and the secondary primary security when some traffic uses a bypass of the primary security appliance and other traffic uses a bypass of the secondary security appliance. That is, both a primary security appliance and a secondary security appliance may be active such that the primary security appliance provides security for some traffic, e.g., traffic that uses the hardware bypass of the secondary security appliance, while the secondary security appliance provides security for other traffic, e.g., traffic that uses the hardware bypass of the primary security appliance.

In general, a L1 hardware bypass is described as being implemented with respect to a system in which there is a primary security appliance and a secondary security appliance, such that the primary security appliance provides inspection and security while the secondary security appliance acts as the L1 hardware bypass. A system may generally include a primary security appliance and multiple secondary security appliances, all daisy chained or connected in series without departing from the spirit or the scope of the disclosure. In other words, an active security appliance may have more than one standby security appliance, such that more than one security appliance may act as an L1 hardware bypass.

When a primary unit fails and a secondary unit takes over inspection and security responsibilities from the primary unit, the secondary unit generally continues to inspect traffic and provide security even after the failure of the primary unit is resolved, e.g., after the primary unit is once again available to resume inspection and security responsibilities. It should be appreciated, however, that in some instances, upon resolving the failure of the primary unit, the primary unit may resume inspection and security responsibilities, and the secondary unit may effectively revert to bypass mode.

While an overall network has been described as being configured generally for a primary unit to receive traffic prior to providing the traffic to a secondary unit, it should be appreciated that in some instances, a secondary unit may receive traffic prior to providing the traffic to a primary unit. In other words, an overall network may instead be configured such that a secondary unit, or a unit in bypass mode, obtains traffic and provides the traffic to a primary unit for security processing.

In one embodiment, two firewall units may be configured for high availability, and may be connected in a daisy chain fashion or in series. One of the firewall units may be a primary unit and the other firewall unit may be a secondary unit such that the primary unit and the secondary unit share the same IP and Media Access Control (MAC) addresses for their data ports. A firewall unit may be configured for a routed mode such that the firewall unit acts as an L3device and routes packets from one subnet to another, and participates in substantially all routing and discovery mechanisms. When a primary unit and a secondary unit share the same IP and MAC addresses, there is effectively no change in upstream and downstream segments, as the secondary unit may perform all of the routing functions of the primary unit.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, structures, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A computer-implemented method comprising executing on a processor the steps of:
    communicably coupling a first security unit and a second security unit in series between a first network and a second network, the first security unit being arranged to obtain packets from the first network, the second security unit arranged to obtain the packets from the first security unit, wherein the first security unit includes first logic arranged to provide security and the second security unit includes second logic arranged to provide security;
    configuring the second security unit in a bypass mode, wherein configuring the second security unit in the bypass mode causes the second logic not to provide security;
    obtaining a first packet from the first network via the first security unit on the second security unit, wherein the first packet is identified as being secure by the first logic arranged to provide security; and
    providing the first packet from the second security unit to the second network, wherein providing the first packet from the second security unit to the second network includes passing the first packet through the second security unit without using the second logic to provide security.

2. The computer-implemented method of claim 1 wherein passing the first packet through the second unit without using the second logic to provide security includes passing the first packet through a layer 1 (L1) hardware bypass included in the second security unit.

3. The computer-implemented method of claim 2 wherein the first security unit and the second security unit are configured for High Availability (HA).

4. The computer-implemented method of claim 1 wherein the first security unit is a first adaptive security appliance (ASA) router and the second security unit is a second ASA router.

5. The computer-implemented method of claim 1 further including:
    obtaining synchronization data from the first security unit on the second security unit, wherein the synchronization data enables the secondary security unit to synchronize with respect to the first security unit.

6. The computer-implemented method of claim 5 further including:
    determining when the first security unit has suffered a failure; and
    configuring the second security unit to use the second logic to provide security if it is determined that the first security unit has suffered the failure.

7. The computer-implemented method of claim 6 wherein after configuring the second security unit to use the second logic to provide security, the computer-implemented method further includes:
    obtaining a second packet from the first network via the first security unit on the second security unit, wherein the first packet is not identified as being secure by the first logic arranged to provide security;
    determining, using the second logic to provide security with respect to the second packet, if the second packet is secure; and
    providing the second packet from the second security unit to the second network if it is determined using the second logic that the second packet is secure.

8. Logic encoded in one or more tangible non-transitory, computer-readable media for execution and when executed operable to:
    obtain a first packet from a first network, the first packet being obtained by a first security unit;
    provide security for the first security unit when the first security unit is in an active mode, wherein the logic operable to provide the security for the first security unit when the first security unit is in the active mode is operable to determine whether the first packet is secure;

cause the first packet to bypass the logic operable to provide the security for the first security unit when the first security unit is in a bypass mode, wherein the logic operable to cause the first packet to bypass the logic operable to provide the security for the first security unit is further operable to cause the first packet to pass through the first security unit; and provide the first packet to a second network.

9. The logic of claim 8 wherein the logic operable to cause the first packet to bypass the logic operable to provide the security for the first security unit when the first security unit is in the bypass mode is further operable to cause the first packet to pass through the first security unit on a layer 1 (L1) hardware bypass.

10. The logic of claim 8 wherein the first security unit is arranged to cooperate with a second security unit to provide High Availability (HA), wherein the logic operable to obtain the first packet from the first network is operable to obtain the first packet from the first network through the second security unit, wherein the first security unit is coupled in series between the second security unit and the second network.

11. The logic of claim 10 further including logic operable to cause the first packet to bypass the logic operable to provide the security for the first security unit when the second security unit is active and the first security unit is in the bypass mode.

12. The logic of claim 11 further including logic operable to determine when the second security unit is no longer active, wherein the logic operable to determine when the second security unit is no longer active is operable to cause the first security unit to transition from the bypass mode to the active mode.

13. The logic of claim 8 wherein the first security unit is a first adaptive security appliance (ASA) router.

14. An apparatus comprising:
a port arrangement, the port arrangement including at least a first input/output (I/O) port and a second I/O port, wherein the port arrangement is configured to obtain a first packet;
a bypass;
a logic arrangement, the logic arrangement including computer program code, the logic arrangement further including a security logic module and a bypass logic module, the security logic module being configured to cause the apparatus to provide security to the first packet obtained on the port arrangement when the apparatus is in an active mode, the bypass logic module arranged to cause the apparatus to pass the first packet through the apparatus on the bypass when the apparatus is in a bypass mode; and
a processor configured to execute the computer program code.

15. The apparatus of claim 14 wherein the bypass is a layer 1 (L1) hardware bypass.

16. The apparatus of claim 14 wherein the security logic module is configured to inspect the first packet and to cause the apparatus to act as a firewall when the apparatus is in the active mode.

17. The apparatus of claim 16 wherein the bypass logic module is configured to pass the first packet through the apparatus on the bypass without inspecting the first packet and without passing the first packet through the firewall.

18. The apparatus of claim 14 wherein the bypass logic module is configured to determine when the apparatus is to switch from the bypass mode to the active mode.

19. The apparatus of claim 18 wherein the apparatus is configured for High Availability, and wherein when it is determined that the apparatus is to switch from the bypass mode to the active mode, the bypass logic module causes the apparatus to switch from the bypass mode to the active mode.

20. The apparatus of claim 14 wherein the apparatus is an Adaptive Security Appliance (ASA).

* * * * *